United States Patent
Becker et al.

(10) Patent No.: US 6,679,020 B2
(45) Date of Patent: Jan. 20, 2004

(54) MULTI-LAYERED SHINGLE AND METHOD OF MAKING SAME

(75) Inventors: Walter F. Becker, St. Petersburg, FL (US); Keith A. Rooks, Hermosa Beach, CA (US); Shelby L. Freeman, Clearwater, FL (US)

(73) Assignee: CertainTeed Corporation, Valley Forge, PA (US)

( * ) Notice: Subject to any disclaimer, the term of this patent is extended or adjusted under 35 U.S.C. 154(b) by 256 days.

(21) Appl. No.: 09/994,393

(22) Filed: Nov. 26, 2001

(65) Prior Publication Data

US 2002/0033225 A1 Mar. 21, 2002

Related U.S. Application Data

(62) Division of application No. 09/303,840, filed on May 3, 1999.

(51) Int. Cl.[7] .................................................. E04D 1/26
(52) U.S. Cl. ............................ 52/518; 52/557; 52/554
(58) Field of Search .......................... 52/518, 557, 555, 52/554, 556

(56) References Cited

U.S. PATENT DOCUMENTS

| | | | |
|---|---|---|---|
| 1,153,418 A | | 9/1915 | Bird |
| 1,698,891 A | | 1/1929 | Overbury |
| 1,829,886 A | | 11/1931 | Yates et al. |
| 1,897,139 A | | 2/1933 | Overbury |
| 2,064,473 A | * | 12/1936 | Holdsworth ............... 52/555 |
| 2,099,131 A | | 11/1937 | Miller |
| 3,180,783 A | * | 4/1965 | Walker et al. ............... 161/93 |
| 3,624,975 A | | 12/1971 | Morgan et al. |
| 3,921,358 A | * | 11/1975 | Bettoli ............... 52/314 |
| 3,998,685 A | | 12/1976 | Czyzewski et al. |
| D247,786 S | | 4/1978 | Flood |
| 4,198,257 A | | 4/1980 | Pfaff |
| 4,274,243 A | | 6/1981 | Corbin et al. |
| 4,634,622 A | | 1/1987 | Jenkins et al. |
| 4,717,614 A | * | 1/1988 | Bondoc et al. ............... 428/143 |
| 4,869,942 A | | 9/1989 | Jennus et al. |
| 5,052,162 A | | 10/1991 | Bush et al. |
| 5,181,361 A | | 1/1993 | Hannah et al. |
| 5,186,980 A | | 2/1993 | Koschitzky |
| 5,209,802 A | | 5/1993 | Hannah et al. |
| 5,287,669 A | | 2/1994 | Hannah et al. |
| 5,375,387 A | | 12/1994 | Davenport |
| 5,426,902 A | | 6/1995 | Stahl et al. |
| 5,660,014 A | | 8/1997 | Stahl et al. |
| 5,860,263 A | | 1/1999 | Sieling et al. |
| 6,038,827 A | * | 3/2000 | Sieling ............... 428/143 |
| 6,105,329 A | * | 8/2000 | Bondoc et al. ............... 428/143 |
| 6,112,492 A | * | 9/2000 | Wells et al. ............... 52/309.1 |
| 6,190,754 B1 | * | 2/2001 | Bondoc et al. ............... 156/260 |
| 6,355,132 B1 | * | 3/2002 | Becker et al. ............... 156/260 |

FOREIGN PATENT DOCUMENTS

CA 963626 3/1975

* cited by examiner

*Primary Examiner*—Carl D. Friedman
*Assistant Examiner*—Basil Katcheves
(74) *Attorney, Agent, or Firm*—Paul & Paul

(57) ABSTRACT

A multi-layered shingle adapted to be positioned with other similar shingles in an overlapping arrangement on a roof to yield a simulated wooden shake roof covering comprising a headlap portion and a butt portion. The butt portion comprises a series of multi-layered tabs. All the tabs have the same number of layers and each multi-layered tab (a) is separated from the next adjacent multi-layered tab or tabs by a space or spaces, respectively, and (b) comprises an uppermost layer and at least two layers underlying the uppermost layer. Each underlying layer is laminated to the layer above it to form a multi-layered laminated composite. The laminated composite is integral with the headlap portion and the top surface of the uppermost layer of each tab is coplanar with the top surface of the headlap portion. The invention also includes an apparatus and a process for the continuous manufacture of the shingles of the invention.

2 Claims, 6 Drawing Sheets

MULTI-LAYERED SHINGLE AND METHOD OF MAKING SAME

CROSS-REFERENCE TO RELATED APPLICATIONS

This is a divisional application of U.S. Application Ser. No. 09/303,840 filed May 3, 1999.

BACKGROUND OF THE INVENTION

1. Field of the Invention

This invention relates to a method for making multi-layered shingles, and to roofing shingles made thereby. The shingles are uniquely thickened to enhance the appearance of a roof.

2. Description of the Prior Art

There have been many approaches by the roofing industry to the task of covering a roof deck with shingles which are both protective and aesthetically pleasing. Whatever their appearance, suitable shingles have been made sufficiently durable and weatherproof for prolonged protection of the roof. The shingles' visual appeal has been attained in various ways, such as by providing particular butt edge contours and surface treatments which function to simulate more traditional, and in most cases more expensive, forms of roof coverings, including thatch, wooden shakes, slates, and even tiles of various forms.

Simulation of such more traditional roof coverings is afforded by asphalt shingles of the laminated type. These shingles provide depth or its appearance on the roof, thus more or less giving the look of the wood or other natural appearing shingles. U.S. Pat. No. 3,921,358 provides an example of such composite shingles. After describing the futile attempts in the past to achieve the irregular, bulky, butt edge profile and surface contour characteristic of wood roofing shingles, this patent presents an improved composite shingle comprising a rectangular sheet having a headlap portion and a butt portion. The butt portion is divided into a series of spaced apart tabs and a strip is secured to the sheet in a position underlying the tabs and filling the spaces therebetween. While the resultant bilaminate structure suggests somewhat the substantial and imposing architectural appearance of the more expensive roofing materials, such as wood shingles, the structure still diverges considerably in appearance from them.

For many years roofing manufacturers have offered a variety of two-layered shingles of the type disclosed in U.S. Pat. No. 3,921,358 in the attempt to present a thicker and more attractive appearance. A structure markedly different from these prior art bilaminate shingles is shown in U.S. Pat. No. 4,869,942. This structure, which has an exposed butt portion three layers in depth, with tabs two layers in depth, and an additional strip under the cut-outs, gives the shingle an appearance that goes well beyond the bilaminates in simulating wood and tile shingles.

Although the asphalt composite shingles have significant cost, service life and non-flammability advantages over wood shingles, the latter type are still seen by many to be a much more desirable roofing material for aesthetic purposes. A key reason for wood shingles' continuing aesthetic appeal stems from their greater thickness relative to the composite shingles, in spite of the many efforts in the past to simulate this thickness. Accordingly, it would be most beneficial to find ways to enhance the appearance of depth in the composite shingles without sacrificing these shingles' advantageous features.

OBJECT OF THE INVENTION

It is therefore an object of the invention to provide an asphalt shingle that simulates very closely the thickness of wood or other traditional roof coverings, and also possesses those attributes desired in roof coverings, including waterproofness, durability and fire-resistance.

It is a further object of the invention to enhance the appearance of a laminated shingle through the use of multiple layers of the butt portion of the shingle.

It is yet another object of the invention to provide a simple, efficient and economical manufacturing process for the continuous production of a laminated shingle from a single indefinitely long roofing sheet.

SUMMARY OF THE INVENTION

The foregoing and other objects of the invention have been achieved by a roof shingle which is multi-layered for enhancement of the shingle's visual appeal and thickness. The composite shingle comprises a headlap portion and a butt portion having three or more layers. The headlap portion may also be multi-layered, comprising two or more layers. The butt portion is divided into a series of spaced apart tabs. The spacing between the tabs significantly exceeds that of the slots which have been formed over the years in the manufacture of multi-layered shingles, such as those disclosed in U.S. Pat. Nos. 5,209,802 and 5,426,902. Such narrow openings, which are typically less than one inch, e.g., about ¼ to ⅝ inch, do not provide the openly spaced and particularly deep wells of a roof surfaced by the shingles of the present invention. The spacing between the tabs of the inventive shingles is greater than 1 inch, preferably greater than 2 inches.

The multi-layered shingle is of the laminated type. The butt portion of this shingle composite is made of at least three laminae, and may have four, five or more laminae. The laminae are preferably constructed of felted material comprising organic or inorganic fibers or a mixture of both. The fibers are usually held together with a binder and are coated, saturated, or otherwise impregnated with an asphaltic bituminous material. The laminae lie one above another in the composite, and are exposed to view as a bulky composite when the shingle is installed on a roof. Inherent in this laminated construction is an appreciable difference in surface elevation between the top surface of the tabs of one shingle and the top surface of the tabs of the underlying shingle(s). The perception of depth is greatly magnified when the array of shingles on the roof is viewed. The viewer's eye will naturally go from the deep wells formed by the adjoining tabs of one shingle to those of the next upper or lower shingle(s) and so forth over the roof.

A preferred laminate manifesting the inventive shingle's unique structure, incomparable to any of the prior art, comprises an asphalt shingle having a headlap portion and a butt portion which extends from the lower boundary of the headlap portion to the butt edge of the shingle and comprises a series of composite tabs which are separated by spaces, each extending from the side edge of one composite tab to that of the next adjacent composite tab, and each of which comprises at least three layers. The type of laminated shingle consisting of a single overlay member and a single underlay tab is well-known and illustrated, for example, in U.S. Pat. Nos. 3,998,685 and 5,052,162.

In accordance with the process of the invention, one or more fibrous sheets, which are to be made into the shingles, are treated with a cementitious waterproofing composition, such as asphalt or other bituminous material. The treatment includes surfacing the sheet or sheets with sufficient waterproofing material to which is adhered granules such as crushed rock, slate or other surfacing material. While the entire outer face of the shingle, i.e. the face which is uppermost when the shingle lies on a roof, is desirably covered over its full extent with granular matter, the portion of the outer face which is important for colorful effects is that portion which is exposed to view when the shingles are laid together in overlapping courses on a roof. Accordingly, the sheet portions which ultimately become these exposed portions are profitably surfaced with colorful granules so as to provide areas of distinctive coloration, and lower cost, less decorative granular material is employed to surface the sheet portions which are to become the covered or hidden areas of the final assemblage.

The process is advantageously carried out continuously with the sheet(s) being transported along a production line for sequential processing. The continuous process is especially useful in the production of laminated shingles from a single elongate sheet. In the process, the top surface of the sheet is coated with asphalt and a coating of granules is applied to this surface. At least two narrow elongate sheets or strips are cut from the total elongate sheet to yield a main sheet and the narrow portions cut therefrom. The narrow elongate sheets are desirably cut from the main sheet in one step, although the cuts may be made in more than one step. The narrow sheets are positioned one above another and below the main sheet. A laminate of the main and narrow sheets is formed.

Desirably, each narrow sheet is coextensive with the other or others, and the narrow sheets are positioned so that the side edges of each one are in the same vertical plane as the respective side edges of the other(s) lying above and/or below. The first narrow sheet moved directly below the main sheet is centered on the longitudinal line which will become the central line of the multi-layered portion of the total composite sheet before cutting of this total sheet. Each succeeding narrow sheet is centered on the narrow one above it. After centering, each cut-off sheet is adhered to the sheet above it to form a composite. Each cut-off sheet may or may not be inverted before adhesion. In the formation of an advantageous embodiment, the last adhered sheet is inverted. When the bottom sheet is thus inverted, the final multi-layered tab portion of the resultant roofing shingle has exposed granules on both its top and bottom. The eventual shingle's butt edge is thickened by the multiple layers and their protruding granules, leading to an assembly of the shingles on a roof which has the aesthetically attractive, bulky look of a roof of wood or tile shingles.

A longitudinal cut is made along the centerline of and within the side boundaries of the multi-layered portion of the totally laminated composite sheet advancing along the production line so as to form two complementary sheets, each individually having multi-layered tabs separated by cut-out portions along the thus cut longitudinal edge. The cut defines a substantially zigzag or "dragons' teeth" configuration comprising a series of interdigitated tabs on each complementary sheet. This side-edge arrangement is of the type described in U.S. Pat. No. 5,052,162. Each resulting composite sheet is cut transversely into shingles of preselected lengths. The zigzag cut desirably forms a series of tabs which differ from one another in each individual shingle so as to create a wooden shake simulation. The final shingle may thus be made from a single sheet, e.g., glass mat, by a process which converts this sheet into a plurality of shingles having multi-layered tabs, each layer being made of a portion of the original sheet. This multi-level roofing shingle is more visually appealing than previous bi-level shingles because of its thicker butt edge. This look of thickness is especially manifest when the shingles are arrayed in rows on a roof and the shingles of each row act like levers lifting the butt edges of the row above and so forth over the entire roof.

An important aspect of the present invention is that it permits laminated shingles having multi-layered tabs, such as those of three layers, to be manufactured continuously and expeditiously from a single sheet(s) of an indefinite length. Each of the steps involved in the formation of the final roofing shingles can be carried out on the base roofing material (e.g., glass fiber mat) as the material advances continuously along the production line in the form of an elongate sheet and strips cut therefrom. The continuously performed steps comprise waterproofing the sheet, coating it with mineral granules, cutting it along its length into elongate strips, laminating these strips together to form a composite multi-level strip, and finally cutting the composite laminated strip into the individual roofing shingles. The granules may be applied before or after the sheet is cut into elongate strips, as described, for example, in U.S. Pat. No. 4,869,942, and may be applied to only a portion of the main sheet or narrow strips. A different coloration may be applied to the main sheet and strips.

In a preferred embodiment of the invention, trilaminated shingles are continuously produced from a single elongate sheet which is waterproofed and coated over its top surface with mineral granules before being cut into elongate strips. Two first straight cuts divide the sheet into three elongate rectangular strips, one much wider than the other two. Advantageously, one of the straight cuts is made near one of the side edges of the original elongate sheet, and the other straight cut is made near the original sheet's opposite side edge. One of the two narrow strips is shifted, without being inverted, to a position underneath the wide strip and the two strips are laminated together. Prior to lamination, the upper strip's undersurface which is to be bonded is advantageously coated with an adhesive material. Additionally, in another embodiment, the lower strip is turned upside down before lamination so that the laminate of the two strips has the granules of the top strip facing upwardly and the granules of the bottom strip facing downwardly. The second narrow strip is shifted underneath and laminated to the bi-level portion formed in the first lamination. Preferably, the undersurface of the bi-level portion is coated with an adhesive and the second narrow strip is turned upside down before lamination so that the total composite will have granules on both the top and bottom of the three-layered, laminated section.

A third cut is made (i) alternately across and generally along the centerline of the tri-level section (i.e., multi-layered portion) formed by the two previous laminations and (ii) within the longitudinal side boundaries of this section. This central cut, which divides the sheet into two elongate parts, is made to form a repeating pattern of interdigitating triply thick tabs so that upon separation each part has a long straight edge along one side which is one layer in thickness and alternating triply layered tabs and cut-out portions along the other side. Each of the narrow strips, which were positioned to underlie the uppermost wider strip, is desirably cut to be wide enough to completely cover the underside of the wider strip's tabs, but not so wide as to extend much toward the long straight edge of the wider strip. The width is desirably sufficient to adequately support the overlying shingle portion and to contribute to ease of production in the continuous manufacturing process. The two elongate laminated sheets are finally cut into suitable lengths for shingles and packaged. This final cutting may be accomplished conveniently just about when the third longitudinal cut is made or thereafter.

The continuous process thus provides a unique shingle structure having alternating tabs, three layers in depth and cut-outs therebetween. Like conventional bilaminates, this structure comprises a rectangular sheet having headlaps and butt portions. When these prior art and inventive laminated shingles are installed in successive offset courses in separate arrangements on a roof, their butt edge portions are exposed to view. Because the inventive trilaminated shingle's butt portion is three layers in depth, with the tabs and cut-outs three layers deep, the shingle presents, through this unusual enlargement of the butt portion, a bulky appearance that very closely approaches that presented by wood and tile shingles.

DESCRIPTION OF THE DRAWINGS

The invention will now be described with reference to the accompanying drawings in which.

DETAILED DESCRIPTION OF THE INVENTION

Figure 1:
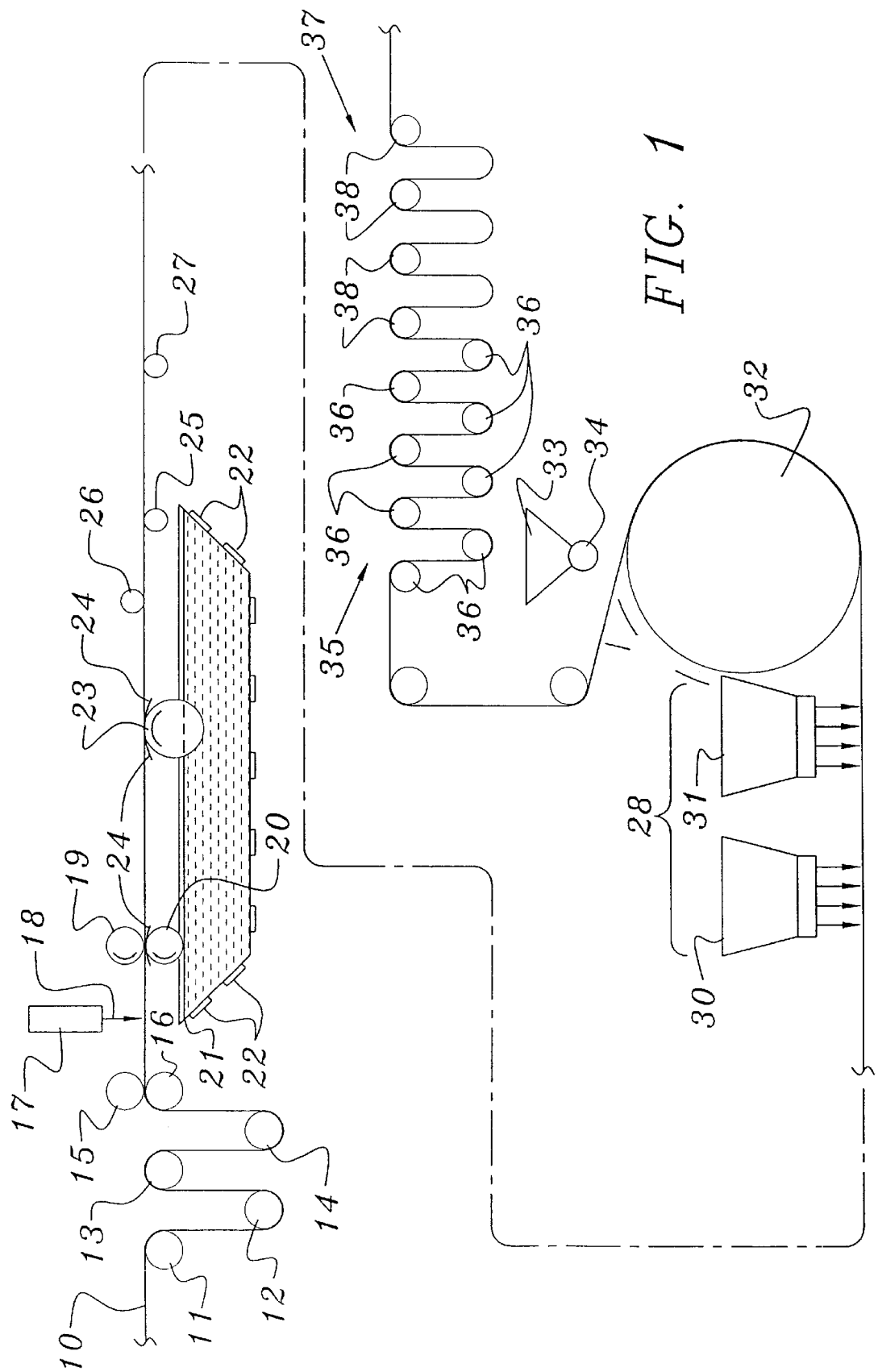
FIGS. 1 and 3 are schematic elevational views of one form of apparatus whereby laminated shingles may be manufactured according to this invention.
Figure 3:
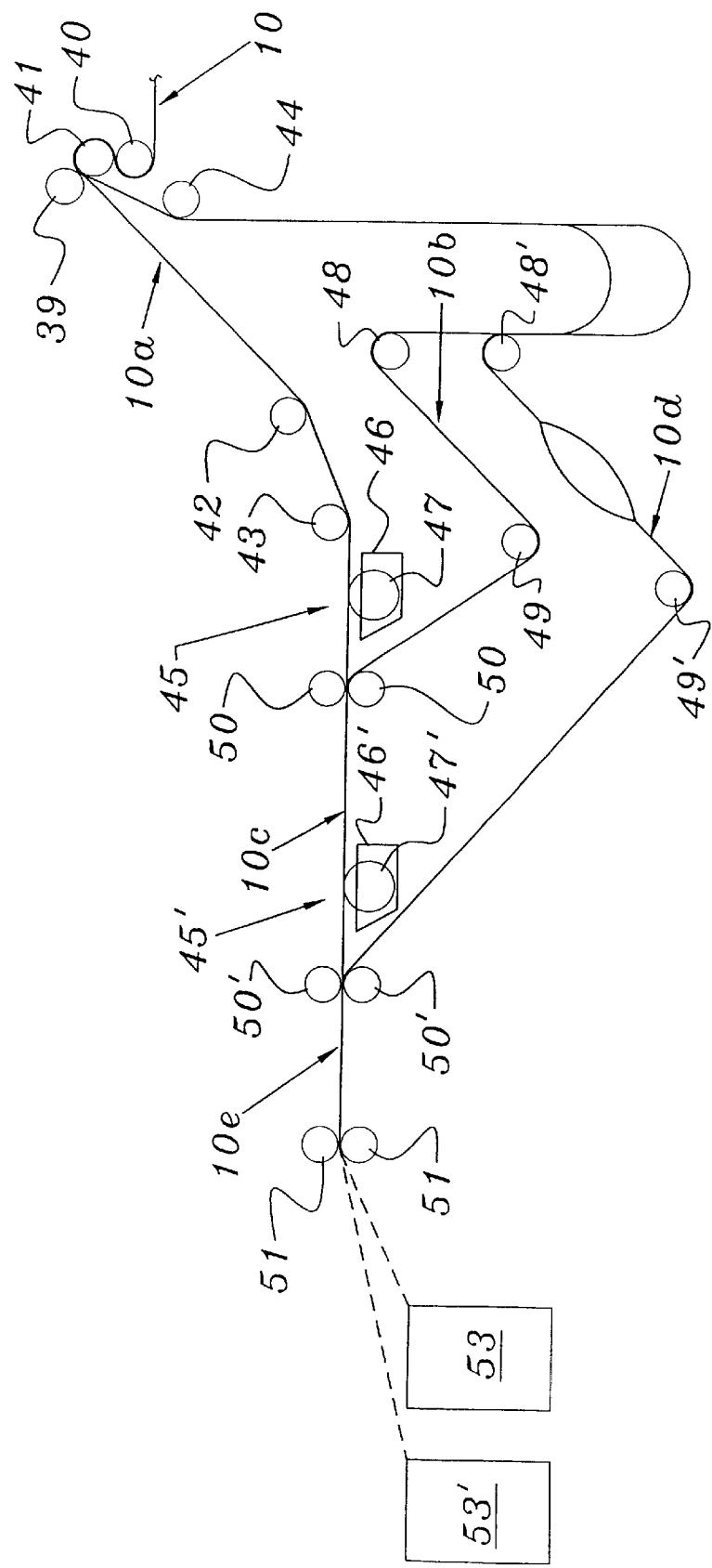

Referring now to the drawings and more specifically to FIGS. 1 and 3 thereof, there is shown diagrammatically an overall process for forming multi-layered roofing shingles according to the instant invention. A rectangular sheet or web 10 of an indefinite length is unwound from a roll (not shown) and fed along the production line. Sheet 10 is preferably a mat of glass fibers but may also be fabricated from organic felt or other types of base material. The glass mat is generally about 38 to 48 inches in width, although other widths can be chosen without departing from the scope of the invention. The sheet generally weighs from about 1.35 to 3.00 lbs/100 ft.$^2$ After sheet 10 is fed over a series of loopers 11–14 and between a pair of tension rollers 15 and 16 for uniform tensioning, it is then passed to a station for the application of filled asphalt coating. Discharge pipe 17 supplies a layer of the asphalt coating 18 to the upper surface of sheet 10 just before the nip of rotating rolls 19 and 20. Reservoir 21 is placed below the coating area to capture runover asphalt from the operation for application to the sheet by back coating roll 20 immersed in the asphalt of reservoir 21. Nip rolls 19 and 20 coact to apply the appropriate weight of asphalt coating to the sheet, with the nip of the rolls providing pressure to ensure that the asphalt has impregnated the sheet properly. Heating units 22 keep the coating asphalt at the proper temperature for application.

Downstream of roll 20 is another back coating roll 23, which is also immersed in reservoir 21 for pickup of liquid asphalt and deposition on the back surface of sheet 10. Sheet 10 may be coated by both rolls, as shown in FIG. 1, or it may be subjected to a single treatment by one or the other of the rolls. Excess asphalt is advantageously wiped from the surface of the back coating roll(s) by a doctor knife(s) 24 or the like, installed on either or both sides of the back coating roll(s) to ensure uniform application and avoid excesses of the asphalt. Downstream of the back coating application there is a doctor blade or knife 25 or the like which removes excess coating from the back or under surface of sheet 10. Sheet 10 is further acted upon by a smoothing roll 26 and a carrier roll 27, which rolls are generally heated.

Stabilized asphalt coating 18 suitably has a softening point as measured by ASTM D36 of from about 195° to 260° F., more preferably from about 215° to 235° F., and is usually applied in an amount from about 50 to 70 pounds, more preferably from about 55 to 65 pounds, per 100 square feet of sheet 10. The coating is advantageously maintained at about 380° to 450° F. before application to the sheet.

After the coating step and while the coating material is still hot, soft and tacky, coated sheet 10 passes beneath surfacing apparatus 28 from which decorative granules are deposited on the upper surface of the sheet. Apparatus 28 includes a series of bins filled with mineral granules and positioned above the longitudinally moving sheet. This known type of roofing machinery is equipped for selectively depositing the mineral granules contained in the bins onto the adhesive upper surface of sheet 10. Apparatus 28 is outfitted with enough bins to hold each collection of granules to be applied to the sheet in the formation of the overall color pattern being developed on the sheet.

Figure 2:
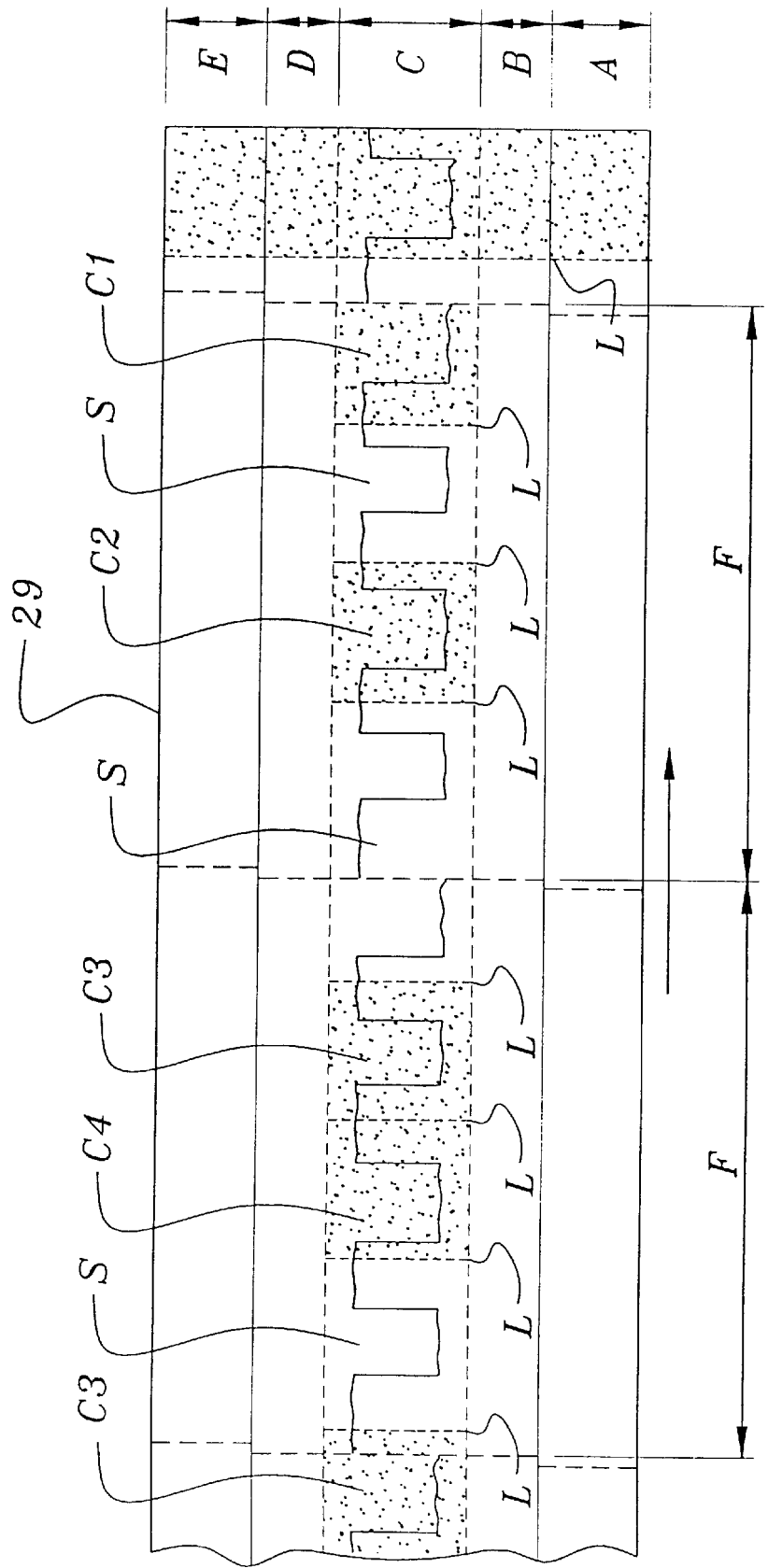
FIG. 2 is a top plan view of a sheet of fibrous material partially coated with granules in accordance with the invention.

In the mineral granule treatment schematically shown in FIG. 2, sheet 10 is moving longitudinally under apparatus 28 in the direction of the arrow. The granule deposition can be understood with reference to the lines extending longitudinally and transversely over the surface of sheet section 29, as shown in FIG. 2. The three solid lines running longitudinally between the two side edges of the sheet correspond to the cuts to be subsequently made in the formation of the component laminae of the shingle, as set forth below. It is seen that there will be two straight cuts and one zigzagged cut. The cutting pattern of FIG. 2 is merely one of many such patterns which could be used to produce the component laminae. The two dashed lines extending lengthwise to either side of the zigzagged line do not correspond to eventual cuts but, in conjunction with the other four straight and parallel lines extending lengthwise, including the side edges, demarcate five zones which are designated zones A–E. As indicated in FIG. 2, the widths of the zones across sheet 10 are as follows: zones A and E-7"; zones B and D-5"; and zone C-14". These five zones extend over the entire length of sheet 10. The overall width of sheet 10 as well as the number and widths of the zones can vary depending on factors such as the capacity of the apparatus and the number and size of the shingles being produced per unit length of the sheet.

The granule discharges which are applied onto the five zones of section 29 are made from the above-mentioned bins of apparatus 28. The bins are contained in two applicator compartments, a so-called blend box 30 and spill box 31. In progressing along the production line, sheet 10 first passes under applicator box 30 which deposits granules onto zone C, and then under applicator 31, which deposits granules onto all of the zones. As shown in FIG. 2, the far right side of section 29 of sheet 10 has passed under both applicator boxes 30 and 31 and thus has granules covering all of the zones, while the left-hand side, having passed under only applicator box 30, has the granules covering only zone C. As sheet 10 progresses further along the production line, the uncovered zones of section 29 will, of course, become covered by granules discharged from applicator box 31.

In a preferred embodiment of the invention, the roof's exposed layers from zone C are in the form of an effectively random series of differently colored portions. To form this random pattern in zone C, applicator (blend) box 30 is equipped with a group of bins, each of which contains variously colored granules for application to zone C. The contents of each bin advantageously consist of blends of the colored granules. The deposition of blends is found to protect against the surface flaws encounterable with the use of singly colored granules. There must be a sufficient number of these bins to produce a random look on the covered roof surface. Suitably, there are at least four such bins each holding different color blends of mineral granules. Applicator box 30 of FIG. 1 has four such bins from which the blends of the contained mineral granules are selectively dropped onto the upper surface of sheet 10 as it passes beneath these bins. The average of the colored granules found in these four bins is contained in a bin of applicator box 31 for the follow-up treatment of zone C described below. This average or composite of all the colored granules not only adds an aesthetically pleasing color variation but also permits the utilization of the inevitable accumulation of the spilled granules from the other bins.

The selective dropping of mineral granules from the bins of applicator box 30 results in deposited bands of mineral granules (so-called "color drops") on zone C. The first four such bands of FIG. 2, which are designated C1 through C4, are bordered by dotted lines L extending across zone C. The deposition from applicator box 30 is interrupted at various randomly located places along zone C, yielding spaces designated S, which are uncovered by granules.

After its passage under applicator box 30, sheet 10 next passes under applicator (spill) box 31, which is divided into a number of bins supplied with granular material and equipped for the simultaneous application of the granules across sheet 10 to complete the coverage of zones A to E. One of these bins continuously delivers to zone C a blend of colored granules which represent the average of the granules deposited from the four bins of applicator box 30. The spaces designated S of zone C become covered with this average blend. Additionally, granules of this blend fill in any spots left uncovered in bands C1 to C4 after the surfacing by applicator box 30.

Applicator boxes 30 and 31 thus together provide on zone C a series of color drops or bands C1 through C4 and S, each band having a variable length and a color which contrasts with the color of the mineral granules in the bands adjacent thereto in the completely granule-covered sheet. In the embodiment illustrated in FIG. 2, each of the color drops onto each of zones C1, C2, C3 and C4 (bounded by a pair of dotted lines) is about 11 inches lengthwise along sheet 10. Applicator boxes 30 and 31 are operated to alternate the color drops from the five mineral granule bins in an effectively random fashion. The term "effectively random fashion" is used since the machinery is constructed to set up a pattern of alternating color drops which for the FIG. 2 embodiment is repeated only after 36 such color drops. This 36 drop cycle results in a pattern of such color drops which, for practical purposes in the final roof covering of the invention, is undetectable visually from an entirely random, nonrepeating pattern.

As shown in FIG. 2, the first six designated color blends or bands from the five granule-containing bins of applicator boxes 30 and 31 discharging onto sheet 10 are C1, S, C2, S, C3 and C4 in order from right to left. Color drop S, which constitutes the average color blend which would result from a combination of the colored granules of drops C1, C2, C3 and C4, is applied twice from its bin in this group of six drops. As sheet 10 advances, applicator boxes 30 and 31 apply this same group of six color blends, viz. C1 to C4 and S (deposited twice), as a set over and over to zone C but with the sequence of the six drops changed from each set to the next. After the application of six differently ordered sets or a total of thirty-six color drops, the cycle of these six sets is repeated on and on over the entire length of sheet 10. The result of this coloring process is an effectively random, nonrepeating color pattern on the shingles' overlying laminae derived from zone C.

Applicator box 31 is further equipped with one or more bins for application, simultaneously with the application of the continuous layers of granules to zone C of continuous layers of granules to zones A, B, D and E. As will hereinafter be understood, the material of the latter four zones form portions which are not visible in the completely constructed and installed shingles of the invention. Accordingly, the granules deposited on these four zones suitably are low cost materials.

As illustrated in FIG. 1, after the stream of granules is discharged from applicator box 31 onto sheet 10, the sheet goes around a slate drum 32 which functions to embed the granular material in the top asphalt coating. In the continued passage of the surfaced sheet 10, excess granules fall off from the sheet into applicator box 31 from which they are reapplied onto the sheet. The back of the sheet then comes under hopper 33 containing fine back-surfacing material, such as talc, mica dust, fine grit, sand or other composition capable of rendering the back of the sheet non-cementitious. The material from hopper 33 is uniformly distributed over the back of the sheet by means of a distributing roll 34. The coated roof sheet at this point generally weighs from about 80–100 lbs/100 ft.$^2$ Sheet 10 next passes through a cooling section 35 which may simply involve a water spray or a series of cooling rolls 36 around which sheet 10 is looped. At the finish looper station 37, the sheet is fed over a series of rolls 38 which control its speed as it advances to the slitting station (see FIG. 3). After embedment of the granular material on sheet 10 by slate drum 32 and prior to slitting of the sheet, adhesive strips (not shown) are desirably applied to the front or back of the sheet. In the final roof covering, this adhesive material acts as a self-sealing means for attaching the shingles in one horizontal course to those in the next upper or lower course. At this interval during shingle production, release tape (also not shown) should be affixed to those sheet portions which in the finished and packaged shingles will come in contact with the above-mentioned adhesive strips of adjacent shingles. Sticking in the package is thereby prevented.

As shown at the right-hand side of FIG. 3, the cooled sheet is pulled by rolls 40 and 41 and divided lengthwise at a slitting station 39, utilizing two cutters, into three portions, a wide sheet 10a and two narrow sheets 10b and 10d. The cutting may be accomplished by any suitable means, such as by cutting wheels. More than two cutting wheels could be utilized for the production of shingles having four or more layered tabs. Advantageously, the original 38 inch wide sheet of the preferred embodiment of FIG. 2 is cut along the lines separating zones A and E from the remainder of sheet 10 or more specifically from zones B through D. Accordingly, for this embodiment, slitting station 39 cuts sheet 10 into a sheet 10a (zones B through D) which is 24 inches wide and two sheets 10b (zone A) and 10d (zone E) which are each 7 inches wide. At this point both the main sheet 10a and the narrow strips 10b and 10d have granules embedded on their upper surfaces.

Sheets 10a and 10b are pulled and guided along by conventional rollers 42–44. The wide sheet 10a is fed over a back coater 45 which comprises a tray 46 containing adhesive, such as asphalt, and a drum 47, whose lower surface rotates in the adhesive-containing tray 46. Drum 47 applies adhesive from the tray to the back side of zone C of the wide sheet 10a to form an adhesive coating zone about the width of the narrow strip 10b (zone A) or 10d (zone E), e.g., about 7 inches wide, to receive strip 10b. The adhesive may be applied as a continuous layer or as strips.

Strip 10b passes up over a guide bar 48 and then across to another guide bar 49. In its passage from guide bar 48 to guide bar 49, strip 10b is shifted underneath strip 10a so that the centerline of the narrower strip is below and coincident with the centerline of zone C of the wider strip. With their centerlines so aligned and their granule-covered surfaces both facing upwardly, the two strips are brought into contact and strip 10b is pressed against the adhesive-coated underside of main strip 10a by laminating rolls 50 to form a composite 10c of the two strips. In a further embodiment of the invention, strip 10b is twisted in its passage from guide bar 48 to guide bar 49 so that its bottom without granules faces upwardly for bonding to the back side of strip 10a. This results in the formation of a laminated composite of the two strips having one layer of granules surfacing the composite's upper surface and another layer of granules surfacing the lower surface of strip 10b.

Trilaminate 10e of the invention is formed by essentially repeating the process carried out in forming bilaminate 10c, as shown in FIG. 3. The wide sheet composite 10c is fed over a back coater 45' comprising an adhesive-containing tray 46' and a drum 47'. Drum 47' applies the adhesive, e.g., asphalt, to the downwardly facing, backside surface of strip 10b (original zone A) which constitutes the lower surface of the laminated portion of sheet 10c.

Strip 10d passes up over a guide bar 48' and then across to another guide bar 49'. In its passage from guide bar 48' to guide bar 49', strip 10d is twisted so that it is turned upside down (180°) and its back without granules faces upwardly for bonding to the laminated portion of the backside of strip 10c. Strip 10d is then shifted underneath strip 10c so that the centerline of the narrower strip is below and coincident with the centerline of the wider strip 10c. With their centerlines so aligned, the two strips are brought into contact and the asphalt coated underside of strip 10c is pressed against the top side (originally bottom side) of narrow strip 10d by laminating rolls 50' to form a composite 10e of the two strips having one layer of granules surfacing the composite's upper surface and another layer of granules surfacing the lower surface of strip 10d. By instead again carrying out the embodiment involving not twisting the lower laminae, a trilaminate will result with granules on the composite's upper surface and the upper surface of each lower layer.

Figure 4:
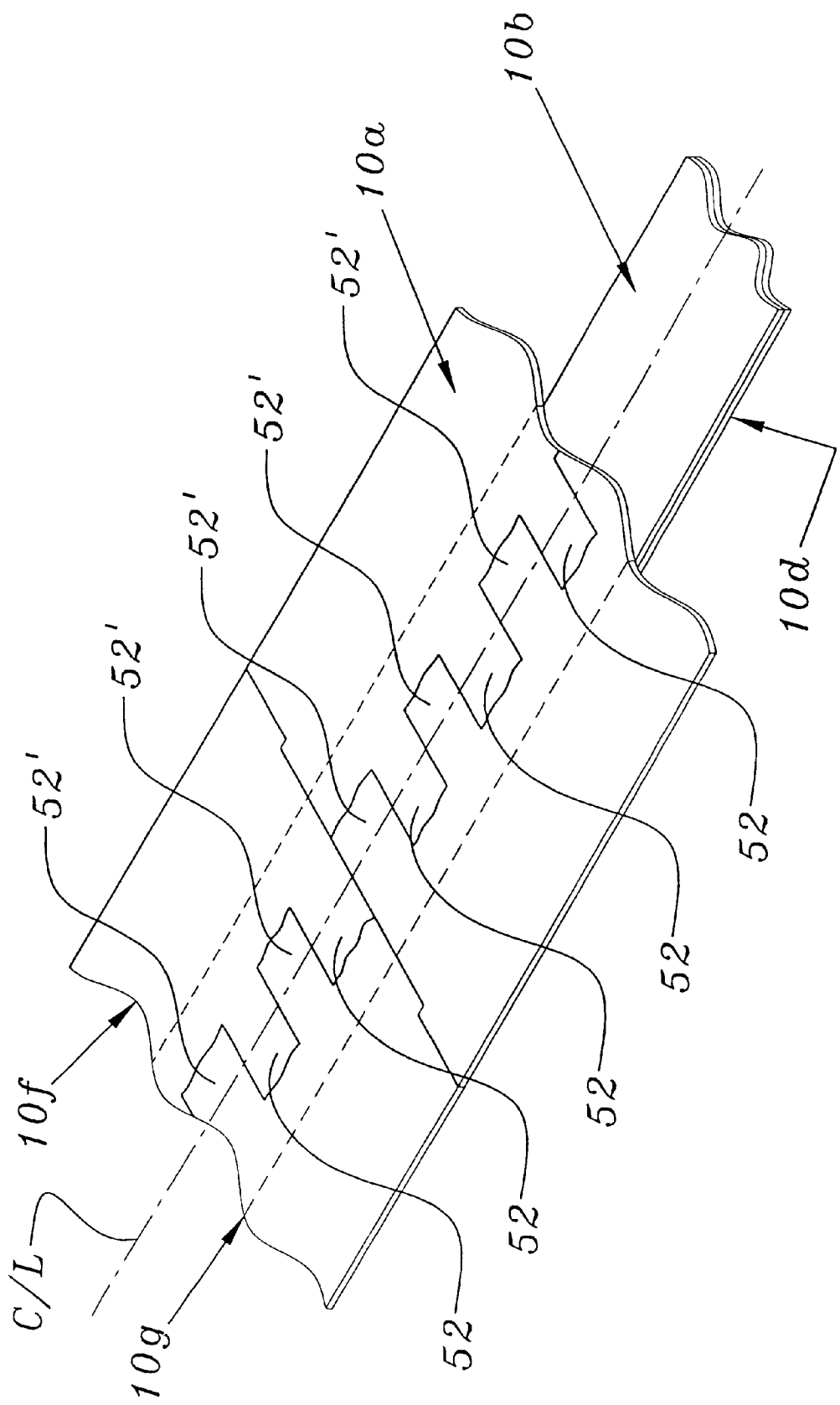
FIG. 4 is a perspective view of the top and two bottom sheets laminated together.
Figure 5:
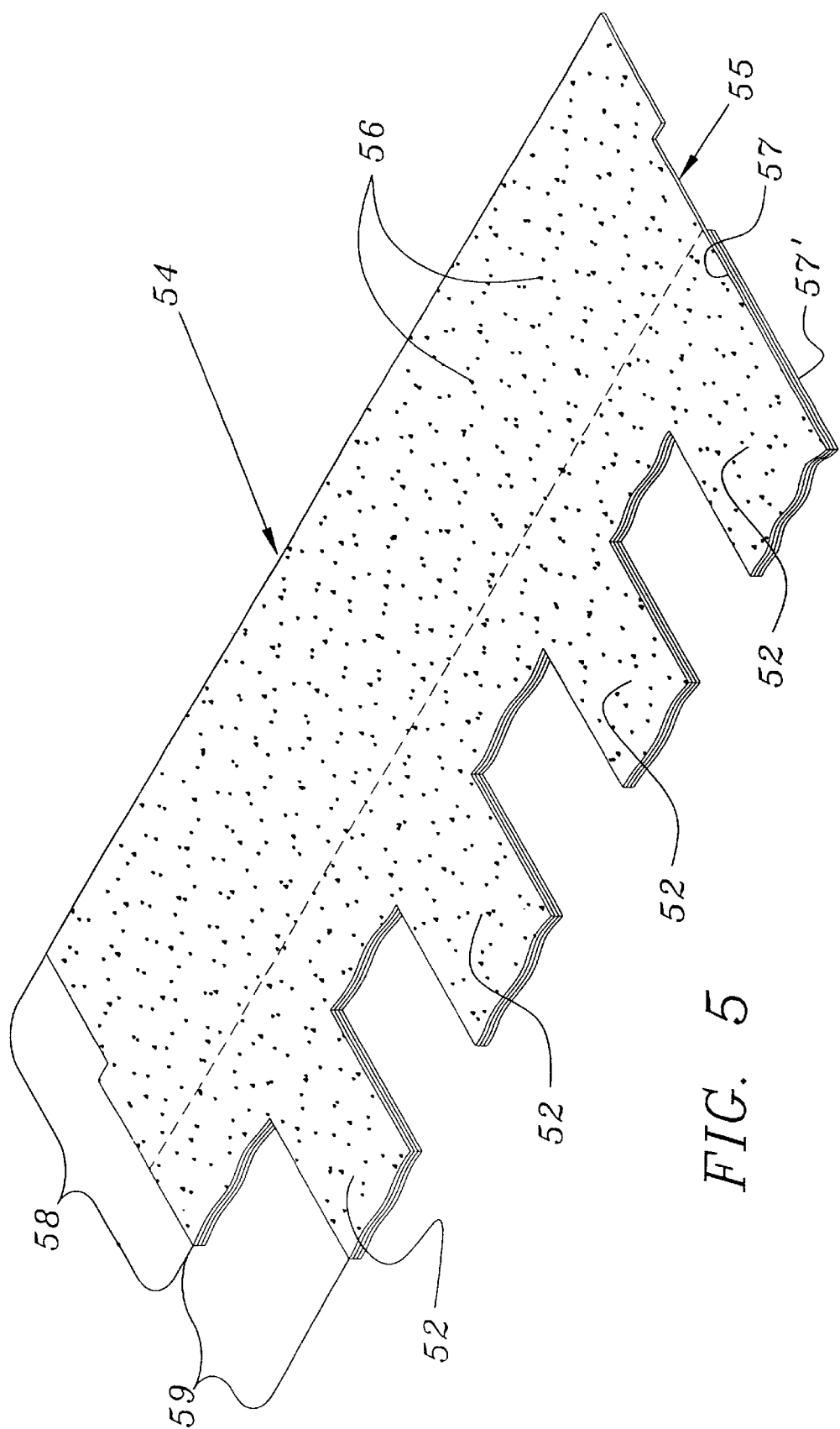
FIG. 5 is a perspective view of the novel roofing shingle of the invention.

As shown in FIG. 3, laminated combination 10e is fed into a cutting station 51 which is equipped to make one lengthwise cut along this laminate. The cutter suitably comprises a lower cutting wheel and an upper anvil roll. The path of the lengthwise cut is illustrated in FIG. 4. While it is not illustrated in FIG. 4, cutting station 51 also profitably makes transverse cuts in laminate 10e to form the individual inventive shingles, one of which is shown in FIG. 5. In FIG. 4, the centerlines of strips 10b and 10d are shown aligned with the centerline of main sheet 10a and the lengthwise cut performed at cutting station 51 is shown as an angularly offset line forming tabs 52 and 52'. The cut separates the laminated sheet 10e into two lengthwise parts 10f and 10g, which comprise two complementary, interlocking-tab strips, each of which is cut transversely of its length into shingles of the desired length by transverse cutters or any other suitable cutting mechanism. An appropriate length F for each shingle is 40 inches, as shown in FIG. 2 for two portions of sheet section 29. In a preferred embodiment, all shingles cut from strip 10f have the same shape and all those cut from strip 10g have the same shape, and the average surface area of all the shingles cut from strip 10f is the same or approximately the same as that of all the shingles cut from strip 10g.

With reference to zones A to E of sheet 10 shown in FIG. 2, it is seen that the topmost layers of strips 10f and 10g are derived from zones B, C and D, and the underlying layers are derived from zones A and E. Each of strips 10f and 10g has tabs which are three layers thick because of the previous laminations of zones A and E underneath the central portion of zones B, C and D. Advantageously, strips 10f and 10g are each 12 inches wide or greater. The resulting shingles are conveyed for packaging to stations 53 and 53'.

FIG. 5 shows a perspective view of a final shingle 54 with an upper main sheet 55 having granules 56 on top and two strips 57, 57' adhered along the angularly shaped edge thereof. Strip 57' has exposed granules on its side facing downwardly. As shown in FIG. 5, shingle 54 comprises a headlap portion 58, which is approximately rectangular in shape, and a butt portion 59, which is divided into the series of spaced-apart tabs 52 which are integral with and extend from the headlap portion 58. A lower longitudinal section of headlap 58 is seen to form part of the top layer of the tri-level portion of shingle 54. The tabs 52 are spaced apart from each other at a distance which will ensure that a considerable portion of an underlying tab(s) will be viewable when an array of the shingles is installed on a roof. The spacing between the tabs may vary and is preferably greater than two inches and more preferably is greater than 2½ inches, such as from about 3 to 7 inches. The tabs 52 may be of equal and/or unequal widths and each width typically is in the same range as that of the spaces therebetween. The tabs may have various shapes.

Figure 6:
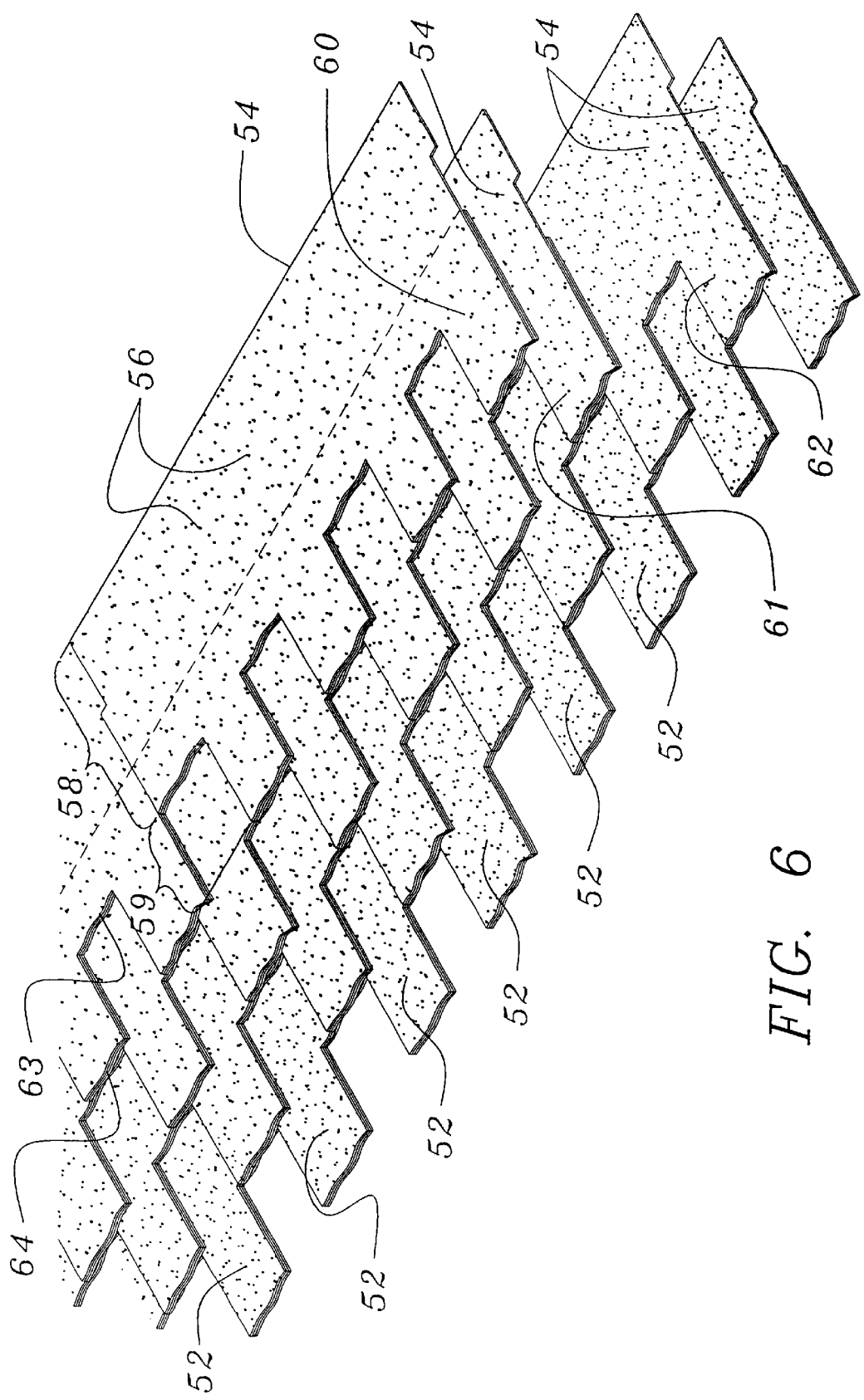
FIG. 6 is a perspective view of an assembly of the shingles of the invention as applied on a roof.

FIG. 6 illustrates a roof covered with a plurality of successive offset courses of laminated shingles 54. The triply thick marginal edge of the butt portion of each shingle of a given course abuts the likewise triply thick marginal edge of the adjacent shingle of that course. Furthermore, as illustrated in FIG. 6, the shingles of a course 60 are offset from the shingles of an immediately subjacent course 61 by a first longitudinal distance and the shingles of course 61 are, in turn, offset from the shingles of the next immediately subjacent course 62 by a second longitudinal distance, the first and second longitudinal distances desirably being unequal to each other. The longitudinal distances may be equal and/or unequal over the entire surface of the roof.

The respective courses of shingles of the FIG. 5 embodiment may be offset from each other at any distance less than the length of a shingle and such distance may be varied at random without adversely affecting the appearance of the ultimate roof covering. Contrarily, the arrangement of the inventive shingles on a roof produces an appealingly variegated look with strikingly deep wells throughout the extent of the roof. As is evident in FIG. 6, a view of the exposed lower edges of the butt portions of shingles of one course in conjunction with the directly lower exposed butt edges of the shingles of a successive course reveals thicknesses which are three times (see 63) and six times (see 64) greater than the thickness of the granule-covered sheet material from which the shingles are made.

We claim:

1. A laminated roofing shingle comprising a headlap portion and a butt portion, the butt portion comprising a series of multi-layered tabs, each tab comprising a fibrous sheet impregnated with a bituminous material and having a coating of granules on a surface thereof, all the multi-layered tabs having the same number of layers and each multi-layered tab (a) being separated from the next adjacent multi-layered tab or tabs by a space or spaces, respectively, and (b) comprising an uppermost layer and at least two layers underlying the uppermost layer, each underlying layer being laminated to the layer above it to form a multi-layered laminated composite, the laminated composite being integral with the heaslap portion and the top surface of the uppermost layer of each tab being coplanar with the top surface of the headlap portion.

2. A roof covering comprising a plurality of successive courses of laminated shingles, the shingles of each course being laid side-by-side, each course being offset from the adjacent course or courses by a distance less than the length of any shingle, and each shingle comprising a headlap portion and a butt portion, the butt portion comprising a series of multi-layered tabs, each tab comprising a fibrous sheet impregnated with a bituminous material and having a coating of granules on a surface thereof, all the multi-layered tabs having the same number of layers and each multi-layered tab (a) being separated from the next adjacent multi-layered tab or tabs by a space or spaces, respectively, and (b) comprising an uppermost layer and at least two layers underlying the uppermost layer, each underlying layer being laminated to the layer above it to form a multi-layered laminated composite, the laminated composite being integral with the headlap portion and the top surface of the uppermost layer of each tab being coplanar with the top surface of the headlap portion.

* * * * *